Dec. 11, 1951      G. SLIDER      2,578,155
DIFFERENTIAL MECHANISM
Filed June 16, 1947
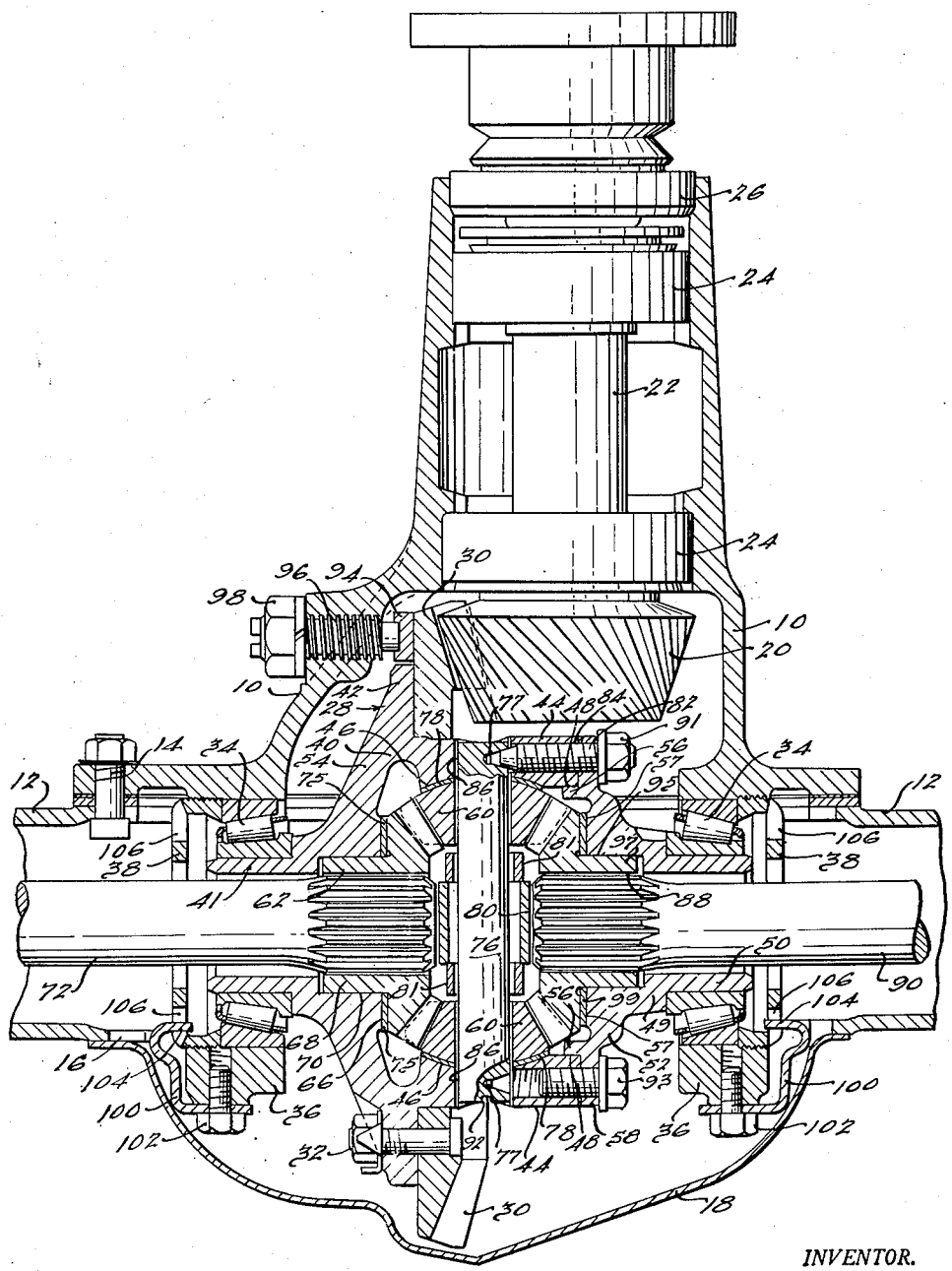
INVENTOR.
George Slider.
BY
Harness and Harris
ATTORNEYS.

Patented Dec. 11, 1951

2,578,155

UNITED STATES PATENT OFFICE 2,578,155

DIFFERENTIAL MECHANISM

George Slider, Detroit, Mich., assignor to Chrysler Corporation, Highland Park, Mich., a corporation of Delaware Application June 16, 1947, Serial No. 754,957

5 Claims. (Cl. 74—713)

This invention relates to an axle structure and more particularly to a differential mechanism for an automobile driving axle.

An object of this invention is to provide a two-piece differential case of an improved, simplified design wherein at least one of the casing bolts used to lock the two pieces of the differential case together also serves as a set screw to position and lock the differential pinion shaft in the case.

Another object of this invention is to provide a combination case bolt and set screw for the differential pinion shaft that is easy to install and that does not require a perfect alignment of the pinion shaft counterbore with the case bolt hole abutting the counterbore prior to driving the set screw home.

Another object of this invention is to provide a two-piece differential case with a combination case bolt and set screw for the differential pinion shaft that may be quickly and easily installed and removed.

Another object of this invention is to provide a two-piece differential casing of an improved design that can be manufactured from either a casting or a forging and that can be machined to final form with a minimum of standard operations.

Another object of the invention is to provide a differential casing formed in two parts to permit easier machining of the internal bearing portions of the casing.

It is also an object of this invention to provide a two-piece casing constructed so as to have the plane of separation of the casing parts in a plane spaced from the axis of the differential pinion shaft.

Other objects and advantages of the invention will more fully appear from the following description taken in connection with the accompanying drawing, in which the figure of the drawing represents a sectional view through an automobile driving axle housing having a differential case embodying my invention, the opposite outer ends of the axles being broken away.

Referring to the drawing, the axle housing comprises a carrier housing 10 and tubular end portions 12 bolted to the carrier 10 by bolts 14. The rear end of the housing 10 has an opening 16 adapted to be closed by a cover plate 18 which is bolted or otherwise detachably secured to the tubular members 12.

A driving pinion 20 is carried by the pinion shaft 22 which is journaled in bearings 24 mounted in the forward end portion of the carrier 10.

An oil seal 26 is pressed in the forward end of the carrier 10.

The two-piece differential case 28 carries a ring gear 30 which is detachably secured to the casing 28 by bolts 32 and is positioned for driving engagement with the pinion 20.

The differential casing 28 has oppositely disposed sleeve portions 41, 50 that are journaled in bearings 34 which are carried by the carrier 10. Split collars 36 are detachably secured to the carrier 10 to hold the bearings 34 in position and adjustable rings 38 position the bearings 34 axially. The rings 38 are screw threaded in the collars 36. A buttress thread is provided between the rings 38 and the collars 36 to obtain maximum thrust for a given size thread. The thrust being in one direction only, namely, outwardly from the differential mechanism, the buttress thread is desirable. The adjustable rings 38 are held in adjusted position by members 100 which are detachably secured to the collars 36 by bolts 102. The members 100 are provided with projections 104 which enter one of a series of openings 106 in the rings 38.

The differential casing 28 is formed in two parts, a cup member 40 and a cap member 49 respectively, so that it will be easier to machine the inner surfaces of the casing to provide bearing seats for the gears mounted therein. The cup part 40 is provided at its bottom portion 54 with a bearing receiving sleeve 41 and ring gear receiving flange 42. The cup part 40 serves as the main body portion of the differential case and has its inner portion machined to receive the two differential pinions 60 and one of the differential side gears 62. By providing an open end on the side wall portion 44 of cup part 40 tools may be easily inserted for the purpose of machining bearing seats 46 and 66 for the pinions 60 and side gear 62, respectively, on the inner walls of cup 40. The side wall portion 44 of cup part 40 has its outer end open and a portion of its inner surface curved concavely to form bearing seats as shown at 46. A flat bearing portion 48 is located outwardly beyond the curved bearing portions 46 of the inner surface of the side wall 44 of cup part 40.

The other part 49 of the two-piece differential housing 28 is made in the form of a cap having an outwardly extending bearing receiving sleeve 50 and a radially extending main body flange 52. Extending inwardly at substantially right angles to the flange 52 is axially extending flange 56 that has its outer periphery machined to accurately fit the bearing portion 48 on the side wall 44 of cup part 40 of the casing so as to position the cap part 49 in proper relation relative to the cup part 40. The outer radially extending portion 58 of flange 52 is formed to engage the outer end portion of the side wall portion 44 of cup part 40. This construction permits the bearing portion 48 of cup 40 to engage the bearing flange 56 of cap part 49 to center the part 49 relative to part 40 with the openings in the bearing sleeves 41 and 50 in proper axial alignment. A bearing seat 57 is formed on the inner face of the cap part 49 to receive a side gear 88 carried by the cap 49.

The side gear 62 is provided with a hub 68 which is journaled in a counterbore 70 in the cup part 40 of the differential housing 28. The axle shaft 72 is splined in the gear 62 and is rotatable therewith. The outer face of the gear 62 bears against a bearing member 75 mounted on bearing seat 66.

The differential pinions 60 are journaled on a differential pinion shaft 76 which is mounted in diametrically disposed openings 86 in the side wall portion 44 of the cup part 40. Bearing members 78 are provided between the outer faces of the pinions 60 and the side wall bearing seats 46 of cup 40. Between the adjacent ends of the pinions 60 on the shaft 76 an axle drive shaft thrust block 80 is mounted between spacer rings 81. The shaft 76 is held in assembled position by a combination casing bolt and set screw 82 which is threaded in a threaded opening 84 in the side wall portion 44 of cup part 40.

The differential pinion shaft 76 is counterbored adjacent its end portions, as shown at 77, to provide openings to receive the tapered end of a combination case bolt and set screw 82. It will be noted that after mounting pinion shaft 76 in the diametrically disposed openings 86 in the side wall portion 44 of cup member 40, the pinion shaft 76 can be rotated so as to substantially align the counterbores 77 of the shaft 76 with the abutting opening 84 in the side wall 44. It is not necessary to secure perfect alignment of these two bolt receiving bores as the set screw 82 will complete the alignment as the tapered end of the set screw 82 is forced into the counterbore 77. For preliminary alignment of the bolt receiving bores 77 and 84 differential pinion shaft 76 has a transverse slot 92 formed in at least one of its end portions adapted to receive the end of a screwdriver or the like to facilitate rotation of pinion shaft 76 after the shaft has been disposed in openings 86 of the cup part 40 of housing 28.

After side gear 62 and differential pinion shaft 76 with differential pinions 60 have been mounted within cup member 40 of housing 28 with the gears in meshing engagement, the combination casing bolt and set screw 82 is threaded into its pinion shaft anchoring position by means of a stud driver or the like. The next step in the assembly of the casing 28 is the mounting of cap member 49 on the cup member 40. Side gear 88 is rotatably mounted in cap member 49. The side gear 88 is formed the same as the side gear 62 and is adapted to be splined to axle shaft 90. Gear 88 is provided with a hub portion 97 which is journalled in a counterbore 95 of cap member 49. The outer face of gear 88 bears against the bearing member 99 which is mounted on bearing face 57. Cap portion 49 carrying side gear 88 is mounted on cup part 40 with side gear 88 meshing with pinion gears 60 and the protruding end of combination casing bolt and set screw 82 extending through one of the casing bolt holes in the peripheral portion of the cap member 49. Gears 60, 62 and 88 are so mounted and interconnected that torque transmission may be accomplished. The axially extending flange 56 of cap member 49 engages the inner bearing surface 48 of side wall portion 44 of cup member 40 when the cap member 49 has been mounted on the protruding end of set screw 82. Casing bolts 93 are next threaded through holes in the cap member 49 into bores in the side wall portion 44 of cup member 40 to lock the cap portion 49 on the cup portion 40. A lock washer and nut 91 are then threaded on the protruding end of the combination casing bolt and set screw 82 to complete the assembly of the differential housing.

A backing bearing 94 is carried by an adjustable screw 96 threaded in carrier 10. The bearing 94 contacts the back face of the ring gear 30 at a point where the load is applied to gear 30 by the pinion 26. A lock nut 98 holds the screw in adjusted position.

The axis of the differential pinion shaft 76 is spaced from the open end of the side portion 44 of cup part 40 so that its axis is not in the plane of the parting line of the two parts 40 and 49. This adds to the rigidity of the casing construction and gives an increased strength over constructions where the differential casing is split at the axis of the differential pinion shaft.

Prior to my invention it was common practice to anchor the differential pinion shaft in the differential casing by means of a separate driven pin. This necessitated lining up an opening in the pinion shaft with an opening through the differential casing wall and then driving the anchoring pin through these aligned openings. While it was time consuming and difficult to perfectly align these openings, another objectional feature of the prior construction and practice was the fact that often in driving the anchoring pin home a portion of the pin was sheared off. Furthermore, in the event the gearing within the differential casing required repair or replacement at some subsequent time it often was a difficult job to remove the anchoring pin to accomplish removal of the differential pinion shaft and the associated gearing. By my invention it is possible to eliminate a separate differential pinion shaft anchoring pin and to use one of the casing bolts that locks the casing cap on the casing cup as the set screw for the pinion shaft. By my invention assembly time is saved as perfect alignment of the anchoring pin bores is unnecessary for the tapered end of the set screw automatically aligns the counterbore in the pinion shaft with the opening in the side wall of the cup member of the casing housing. My combination casing bolt and set screw 82 is easy to install as it may be driven home by a stud driver and in the event this combination bolt and set screw needs to be removed at some later time it is a simple task to remove the set screw nut 91 and apply a wrench or the like to the protruding end of set screw 82 to unscrew it from the cup member 40 of the differential case 28. My combination set screw and casing bolt not only eliminates a separate anchoring pin and the steps required for its installation but it also eliminates several machining steps in that the bore through the cup member 40 for the set screw is made at the same time as the other bores for the casing bolts 93. It is obvious that both ends of the differential pinion shaft 76 may be anchored with combination casing bolts and set screws if it is so desired.

I claim:

1. In an axle assembly comprising a differential carrier and a driving pinion journalled in said carrier, a two-piece differential case journalled in said carrier, a driven gear carried by said differential case and positioned for driving engagement with said pinion, said two-piece differential case comprising a cup member having a bearing seat on the inner side of its bottom end portion and being open at its opposite end, oppositely disposed bearing seats on the inner surfaces of the side wall portion of said cup member, a side gear journalled in the bottom portion of said cup member adjacent the bearing seat in said bottom portion, a differential pinion shaft carried by the cup member, the end portions of said shaft being mounted in oppositely disposed aligned openings in the side wall portion of said cup member intermediate the ends of said cup member adjacent the bearing seats in said side wall portion, pinion gears mounted on said pinion shaft, a removable cap member mounted on the open end of said cup member having a bearing seat on its inner face and peripheral flange portions adapted to seat on the open end portion of said cup member, a side gear journalled in the inner face of said cap member adjacent the bearing seat therein and meshingly engaging the said pinion gears, the gears within said case being interconnected for the transmission of torque, and casing bolts threaded through the cap member into the side wall of said cup member to connect said cap member to said cup member, at least one of said bolts functioning as a combination casing bolt and set screw and having an inner end portion adapted to seat against a side wall contained end portion of said pinion shaft to anchor said shaft in said cup member 2. In a differential mechanism, a two-piece differential case adapted to be mounted in a carrier member, said case comprising a cup member having a bottom portion and a side wall portion integral with and extending at right angles to said bottom portion, the outer end of said side wall portion being open and having its inner peripheral wall adjacent the open end formed to provide a cylindrical bearing surface, a side gear journalled in the bottom portion of said cup member, a differential pinion shaft carried by said cup member, the end portions of said shaft being mounted in oppositely disposed openings in the side wall portion of said cup member, one of said end portions having a counterbore therein, pinion gears mounted on said pinion shaft, a cap member for said cup member having an inwardly extending flange portion adjacent its outer periphery formed to provide a cylindrical bearing surface adapted to seat within the bearing surface at the open end of said cup member, a side gear journalled in the inner face of said cap member, the several gears within said case being interconnected for the transmission of torque, and casing bolts threaded through the peripheral portion of said cap member into the side wall portion of said cup member to removably connect said cap member to said cup member, at least one of said bolts functioning as a combination casing bolt and set screw and comprising a threaded stud member provided with a tapered inner end portion adapted to be seated in the counterbore in the end portion of said pinion shaft to anchor said shaft in said cup member and a nut member adapted to be threaded on the outer end of said stud member.

3. In an axle assembly, a two-piece differential case comprising a cup member having a peripheral flange carrying a driven ring gear, said cup member having a side gear journalled in its bottom end portion and being open at its opposite end, a differential pinion shaft carried by said cup member, the end portions of said shaft being mounted in oppositely disposed, aligned openings in the side wall portion of said cup member, said openings being located intermediate the ends of the cup member, one of said end portions having a transversely extending tapered counterbore therein, pinion gears mounted on said pinion shaft, a removable cap member mounted on the open end of said cup member, said cap member having peripheral flange portions adapted to seat on the open end portion of said cup member, a side gear journalled in the inner face of said cap member meshingly engaging said pinion gears, the gears within said case being interconnected for torque transmission, and casing bolts threaded through the cap member into the side wall of said cup member to connect said cap member to said cup member, at least one of said bolts functioning as a combination casing bolt and set screw and having a tapered inner end portion adapted to seat in the counterbore in the end portion of said pinion shaft to anchor said shaft in said cup member.

4. In an axle assembly, a two-piece differential case, said differential case comprising a cup member carrying a driven gear and having a side gear journalled in its bottom portion and being open at its opposite end, a differential pinion shaft extending transversely of and carried by said cup member, the end portions of said shaft being mounted in oppositely disposed openings in the side wall portion of said cup member at points intermediate the ends of said cup member, at least one of said pinion shaft end portions having a tapered counterbore therein, pinion gears mounted on said pinion shaft, a removable cap member for the open end of said cup member, said cap member being adapted to seat on the open end portion of said cup member, a side gear journalled in the inner face of said cap member, the gears within said case being interconnected for the transmission of torque, and casing bolts threaded through the cap member into the side wall of said cup member to connect said cap member to said cup member, at least one of said bolts functioning as a combination casing bolt and set screw and comprising a threaded stud member with a tapered inner end portion adapted to seat in the counterbore in the end portion of said pinion shaft to anchor said shaft in said cup member and a nut member adapted to be threaded on the outer end of said stud member.

5. In a differential mechanism, a two-piece differential case adapted to be rotatably mounted in a carrier member, said case comprising a cup member having a substantially plate-like bottom end portion and a cylindrically shaped side wall portion integral with and extending at righ angles to said bottom portion, the outer end of said side wall portion being open and formed to provide a flat, circular bearing surface, a differential pinion shaft arranged to extend transversely of and to be carried by said cup member, the end portions of said pinion shaft being mounted in oppositely disposed openings in the side wall portion of said cup member intermediate the bottom and open end of said cup member, a cap member for said cup member having a flange portion adjacent its outer periphery formed to seat on the bearing surface at the open end of said cup member, and casing bolts threaded through the peripheral portion of said cap member into the side wall portion of said cup member to removably connect said cap member to said cup member, at least one of said bolts functioning as a combination casing bolt and set screw and being provided with an inner end portion adapted to be seated against a side wall contained end portion of said pinion shaft to anchor said shaft in said cup member.

GEORGE SLIDER.

REFERENCES CITED

The following references are of record in the file of this patent:

UNITED STATES PATENTS

| Number | Name | Date |
|---|---|---|
| 1,471,915 | Page | Oct. 23, 1923 |
| 1,792,485 | Fawick | Feb. 17, 1931 |
| 2,016,343 | Oberem | Oct. 8, 1935 |
| 2,050,344 | Lapham | Aug 11, 1936 |
| 2,140,190 | Riblet | Dec. 13, 1938 |
| 2,267,562 | Higgins | Dec. 23, 1941 |
| 2,393,557 | Orshansky | Jan. 22, 1946 |

FOREIGN PATENTS

| Number | Country | Date |
|---|---|---|
| 17,272 | Great Britain | Aug. 28, 1901 |
| 178,723 | Switzerland | Oct. 16, 1935 |